US007875989B2

(12) United States Patent
Morris et al.

(10) Patent No.: US 7,875,989 B2
(45) Date of Patent: Jan. 25, 2011

(54) POWER SOURCE FOR AIRCRAFT ENGINE CONTROLLER SYSTEMS

(75) Inventors: James Paul Morris, Montoursville, PA (US); Forrest Ross Lysinger, Harrisburg, PA (US)

(73) Assignee: Lycoming Engines, a division of Avco Corporation, Williamsport, PA (US)

( * ) Notice: Subject to any disclaimer, the term of this patent is extended or adjusted under 35 U.S.C. 154(b) by 664 days.

(21) Appl. No.: 11/899,053

(22) Filed: Sep. 4, 2007

(65) Prior Publication Data

US 2009/0058183 A1    Mar. 5, 2009

(51) Int. Cl.
F02D 29/06    (2006.01)
H02P 9/00    (2006.01)
(52) U.S. Cl. ....................... 290/40 B; 322/44
(58) Field of Classification Search .............. 322/44, 322/29, 89; 290/40 B, 4 A, 31; 307/64, 9.1
See application file for complete search history.

(56) References Cited

U.S. PATENT DOCUMENTS

| 3,748,492 | A | * | 7/1973 | Baker ..................... 307/117 |
| 4,709,201 | A | * | 11/1987 | Schaefer et al. ............ 320/112 |
| 5,097,659 | A |   | 3/1992 | Lampe et al. |
| 5,734,237 | A | * | 3/1998 | Engel ..................... 318/139 |
| 5,899,411 | A |   | 5/1999 | Latos et al. |
| 6,142,418 | A |   | 11/2000 | Weber et al. |
| 6,157,168 | A | * | 12/2000 | Malik ..................... 320/128 |
| 7,258,572 | B2 | * | 8/2007 | Milan ..................... 439/502 |
| 7,538,521 | B2 | * | 5/2009 | Berenger .................. 322/25 |
| 2006/0267411 | A1 | * | 11/2006 | Farmer .................... 307/66 |
| 2008/0258560 | A1 | * | 10/2008 | Dubois et al. .............. 307/31 |
| 2009/0200870 | A1 | * | 8/2009 | Uno et al. ................. 307/80 |

FOREIGN PATENT DOCUMENTS

| EP | 1852953 A | 11/2007 |
| WO | 99/63212 A | 12/1999 |
| WO | 2006/087379 A | 8/2006 |
| WO | WO 2006/087379 A1 * | 8/2006 |

OTHER PUBLICATIONS

International Search Report and Written Opinion for PCT/US2008/064879, mailed on Jul. 24, 2009.

* cited by examiner

*Primary Examiner*—Julio Cesar Gonzalez
(74) *Attorney, Agent, or Firm*—BainwoodHuang

(57) ABSTRACT

An aircraft engine power distribution system for an aircraft engine controller, such as a FADEC, is provided where the power source is independent from the conventional airframe power system, without the need for a back-up battery. The aircraft engine power distribution system includes a magnetic generator operated by an aircraft engine. The aircraft engine power distribution system also includes a power distributor that rectifies the generator output and provides the rectified power to the engine controller as its primary source of power. In this configuration, as long as the aircraft engine is able to operate the magnetic generator, the engine controller receives power. Accordingly, the engine controller operates regardless of the operational status of the airframe power system.

16 Claims, 5 Drawing Sheets

POWER SOURCE FOR AIRCRAFT ENGINE CONTROLLER SYSTEMS

BACKGROUND

In conventional aircraft engines, engine controllers, such as full authority digital engine controllers (FADECs), control certain operating characteristics of the engines to enhance the engines' performance. For example, FADECs typically include a variety of sensors that measure, for example, various environmental and engine conditions such as engine temperature, engine fluid pressures, air temperature, and air density and a digital computer, known as an electronic engine control (EEC) unit. During operation of the engine, the EEC unit receives data signals from the sensors and calculates engine operating parameters based upon the data signals. Based upon the engine operating parameters, the FADEC controls certain engine components, such as the engine's fuel injection system and ignition timing, to adjust the engine's fuel usage and optimize the engine's performance.

Conventional aircraft engines also include an airframe power system to provide power to electrical components associated with the aircraft engine. Airframe power systems typically include two separate alternators where each alternator charges a corresponding battery. For the purpose of meeting Federal Aviation Administration (FAA) regulations, a conventional FADEC is typically powered using the airframe power system. During operation, the FADEC draws power from one of the airframe power system's continuously charged batteries. In the event that the alternator associated with the battery powering the FADEC fails, the FADEC draws power from the second continuously charged battery of the airframe power system until the battery's power dissipates.

SUMMARY

Conventional power systems that provide power to engine controllers, such as FADECs can suffer from a variety of deficiencies. For example, as indicated above, conventional airframe power systems, require the use of two batteries with one battery acting as the primary power supply to the engine controller and the second battery acting as a backup to the primary battery. In the event of failure or drainage of the primary battery, the engine controller would draw power from the secondary battery to continue operation. However, the use of two batteries as part of a redundant system can increase the overall weight of the aircraft and can reduce the ability of the aircraft to carry additional payload. Additionally, as indicated above, conventional airframe power systems utilize two separate alternators where each alternator charges a corresponding battery. In the event of failure of both alternators in the airframe power system, the engine controllers or other electrical components associated with the aircraft can drain both the primary and backup batteries. Accordingly, with no power, the engine controllers would become inoperable. Such inoperability can disrupt the operation of the aircraft engine during the aircraft's flight. Also, alternators are field coil machines that require a power source (i.e., additional batteries) to provide a charge to the coils during operation. The use of additional power source batteries as part of a redundant system can increase the overall weight of the aircraft and can reduce the load carrying capacity of the aircraft.

Embodiments of the present invention overcome these deficiencies and provide an aircraft engine power distribution system for an aircraft engine controller, such as a FADEC, where the power source is independent from the conventional airframe power system. The aircraft engine power distribution system includes a magnetic generator operated by an aircraft engine. The aircraft engine power distribution system also includes a power distributor that rectifies the generator output and provides the rectified power to the engine controller as its primary source of power. In this configuration, as long as the aircraft engine is able to rotate the magnetic generator, the engine controller receives power. Accordingly, the engine controller operates regardless of the operational status of the airframe power system. Additionally, in the event of failure of the magnetic generator, the power distributor is configured to provide power to the engine controller through the conventional airframe power system. In such a case, the aircraft engine power distribution system provides the aircraft operator with a warning regarding the switch to the airframe power system to allow the operator to land the aircraft and have the aircraft serviced.

In one arrangement, an aircraft engine power distribution system includes a generator driven by an aircraft engine and a power distributor in electrical communication with the generator. The generator is configured to produce a generator power output when driven by the aircraft engine. The power distributor is operable to receive the generator power output and provide the generator power output to an engine controller as a primary power output to operate the engine controller. Use of the generator as part of the aircraft engine power distribution system minimizes the need for additional dedicated batteries, such as used with field coil machines, to be used in powering the generator during operation, thereby saving on space in the aircraft and reducing the overall weight of the aircraft.

In one arrangement, an aircraft engine control system includes a generator driven by an aircraft engine, the generator configured to produce a generator power output when driven by the aircraft engine and an engine controller operable to control at least one performance parameter of the aircraft engine. The aircraft engine control system also includes a power distributor in electrical communication with the generator and the engine controller. The power distributor is operable to receive the generator power output and provide the generator power output to the engine controller as a primary power output to operate the engine controller.

In one arrangement, a method for providing power to an aircraft engine controller includes receiving a generator power output from a generator, comparing a voltage associated with the generator power output with a threshold voltage value, providing the generator power output to the aircraft engine controller when the voltage associated with the generator power output is above the threshold voltage value, and providing a battery power output generated by an airframe power system battery to the aircraft engine controller when the voltage associated with the generator power output falls below the threshold voltage value.

In one arrangement, an aircraft engine power distribution system includes a power generator circuit driven by an aircraft engine, the power generator circuit configured to produce a generated power output when driven by the aircraft engine, the power generator circuit being independent from an airframe power system. The aircraft engine power distribution system also includes a power distributor having a first power distributor input in electrical communication with the power generator circuit, a second power distributor input in electrical communication with an airframe power system battery, the airframe power system battery being operable to produce a battery power output, and a power distributor output in electrical communication with the first power distributor input and the second power distributor input. The power distributor is operable to provide the generated power output, received at the first power distributor input, to the engine controller via the power distributor output as a primary power output to operate the engine controller. The power distributor is also operable to provide the battery power output, received at the second power distributor input, to the engine controller via the power distributor output as a back-up power output to operate the engine controller in the event of inoperability of the generator.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention provide an aircraft engine power distribution system for an aircraft engine controller, such as a FADEC, where the power source is independent from the conventional airframe power system. The aircraft engine power distribution system includes a magnetic generator operated by an aircraft engine. The aircraft engine power distribution system also includes a power distributor that rectifies the generator output and provides the rectified power to the engine controller as its primary source of power. In this configuration, as long as the aircraft engine is able to operate the magnetic generator, the engine controller receives power. Accordingly, the engine controller operates regardless of the operational status of the airframe power system. Additionally, in the event of failure of the magnetic generator, the power distributor is configured to provide power to the engine controller through the conventional airframe power system. In such a case, the aircraft engine power distribution system provides the aircraft operator with a warning regarding the switch to the airframe power system to allow the operator to land the aircraft and have the aircraft serviced.

Figure 1:
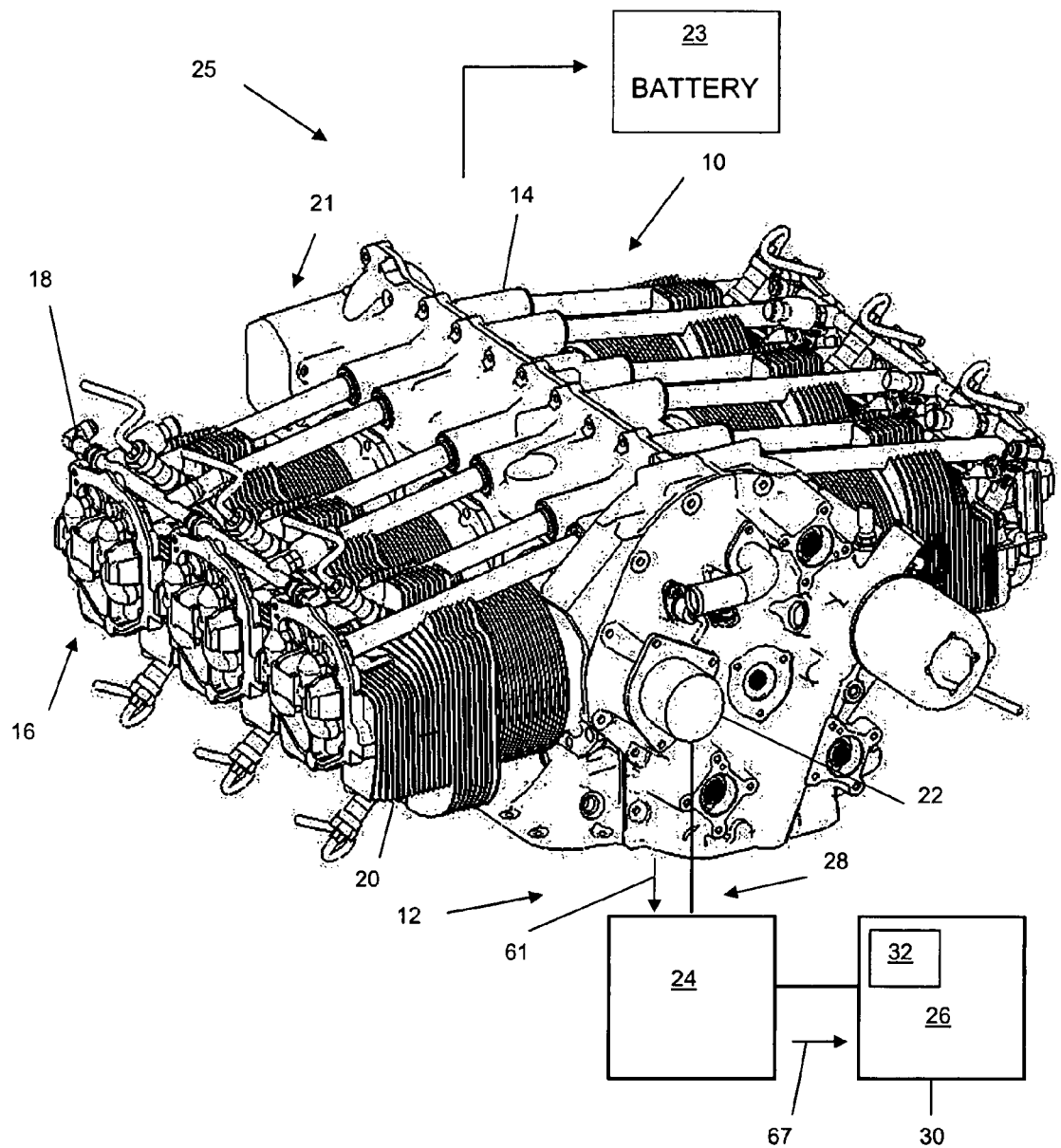
FIG. 1 illustrates an aircraft engine control system according to one embodiment of the invention.

FIG. 1 illustrates an arrangement of an aircraft engine 10 and an aircraft engine control system 12. The aircraft engine 10 includes a crankcase housing 14 that contains a crankshaft (not shown) and that carries cylinder assemblies 16 and a fuel delivery system 18. Each cylinder assembly 16 includes a connecting rod (not shown) that connects the crankshaft to piston (not shown) disposed within the cylinder housings 20 of each cylinder assembly 16. The fuel delivery system 18 is configured to provide fuel from a fuel source to each of the cylinder assemblies 16. In use, each cylinder assembly 16 receives fuel via the fuel delivery system 18. The fuel air mixture burns within each cylinder assembly housing 20 thereby causing the piston and connecting rod disposed within each cylinder assembly housing 20 to reciprocate therein. The reciprocating motion of the piston and connecting rod rotates the crankshaft which, in turn, rotates other components associated with the aircraft engine 10.

The aircraft engine 10 also includes an alternator 21 electrically coupled to a battery 23 to form an airframe power system 25. In use, the alternator 21 charges the battery 23 which provides power, termed airframe power, to various electrical components on the aircraft.

The aircraft engine control system 12 also includes a power generator circuit, such as a generator 22, a power distributor 24, and an engine controller 26. The generator 22 and power distributor 24 collectively form an aircraft engine power distribution system 28 and function as the primary power source for the engine controller 26. Accordingly, as will be described in detail below, the aircraft engine power distribution system 28 operates as a dedicated power source for the engine controller 26 and generates power for the engine controller 26 independent from the power generated by the airframe power system.

The engine controller 26 is configured to control the performance of the aircraft engine 10 during operation. While the engine controller 26 can be configured in a variety of ways, in one arrangement the engine controller 26 is configured as a Full Authority Digital Engine Controller (FADEC) 30. The FADEC 30 includes a variety of sensors (not shown) that measure various environmental and engine conditions such as engine temperature, engine fluid pressures, air temperature, and air density. The FADEC 30 also includes an electronic engine control (EEC) unit 32, such as a processor and a memory, that receives various data signals from the sensors and that calculates engine operating parameters based upon the data signals. Based upon the engine operating parameters, the FADEC 30 optimizes the performance of the aircraft engine 10 by adjusting the aircraft engine's fuel metering system to control the flow of fuel to the cylinder assemblies 16, and optimizes spark timing.

Figure 2:
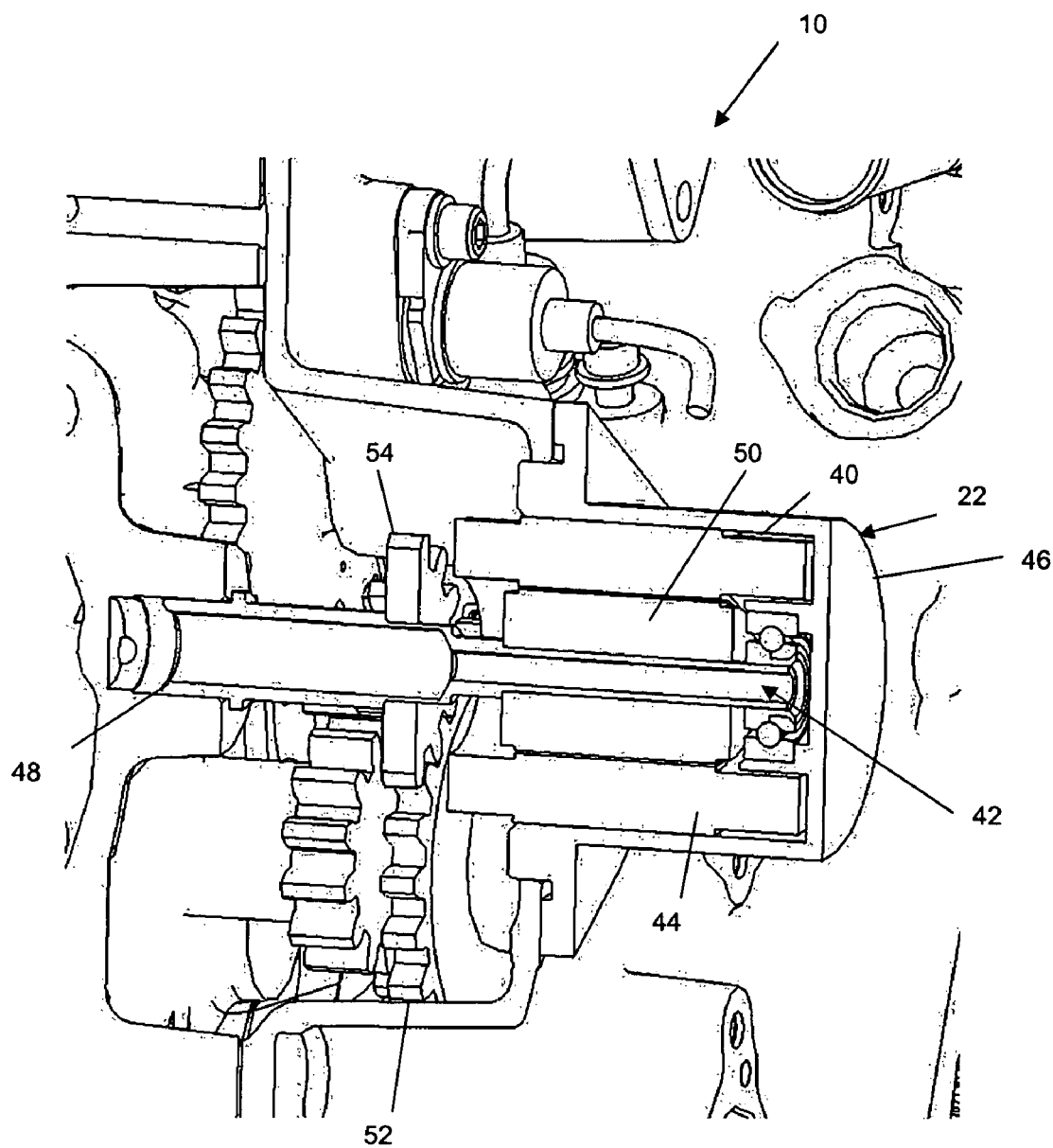
FIG. 2 illustrates a sectional view of a generator of the aircraft control system of FIG. 1.

The generator 22 operates as the dedicated power source for the engine controller 26. While the generator can be configured in a variety of ways, in one arrangement the generator 22 is configured as a permanent magnet generator. For example, with reference to FIG. 2, the generator 22 includes a stator 40, an armature 42, and a housing 46. The stator 40 includes three sets of wire coils 44 disposed within the magnetic generator housing 46. The armature 42 includes a shaft 48 that carries a magnet 50 where the magnet 46 generates a magnetic field relative to the wire coils 44. The aircraft engine 10 mechanically couples to the armature 42 of the generator 22. For example, the aircraft engine 10 includes one or more gears 52 driven by the aircraft engine's crankshaft during operation. The gear 52 of the aircraft engine 10 meshes with a gear 54 carried by the armature 42 of the generator 22. In use, as the aircraft engine 10 operates, the crankshaft causes the gears 52 to rotate. In response, the gears 52 rotate the armature 42 of the permanent magnetic generator 22 relative to the stationary wire coils 44 to generate a current in the sets of wire coils 44. The permanent magnetic generator 22 provides the current, termed a generator power output 61, to the engine controller 26 via the power distributor 24, as the primary power output (i.e., as the operational power for the engine controller 26). The engine controller 26 uses the primary power output during normal operation.

As indicated above, the permanent magnetic generator 22 is a dedicated power source for the engine controller 26 and operates as the primary source of power for the engine controller 26 during operation, independent of the airframe power system. By contrast to the alternator 21 of the airframe power system, with the exception of airframe power required at the startup of the aircraft engine 10, the generator 22 does not require a separate power source, such as a battery, to charge its windings in order to operate. Accordingly, use of the generator 22 as part of the aircraft engine power distribution system 12 minimizes the need for additional dedicated batteries, such as used with alternators or field coil machines, to be used in powering the generator 22 during operation, thereby saving on space in the aircraft and limiting the overall weight of the aircraft As indicated above, the power distributor 24 is operable to receive the generator power output 61 from the permanent magnetic generator 22 and provide the generator power output 61 to the engine controller 26 as a sole or primary power output 67 to operate the engine controller 26. For example, in one arrangement, the permanent magnetic generator 22 provides a three-phase alternating current (AC) to the power distributor 24 as the generator power output 61 when driven by the aircraft engine 10. As described with reference to FIG. 3, the power distributor 24 is configured to process the generator power output 61 received from the generator 22 and provide a resulting primary power output 67 to the engine controller 26.

Figure 3:
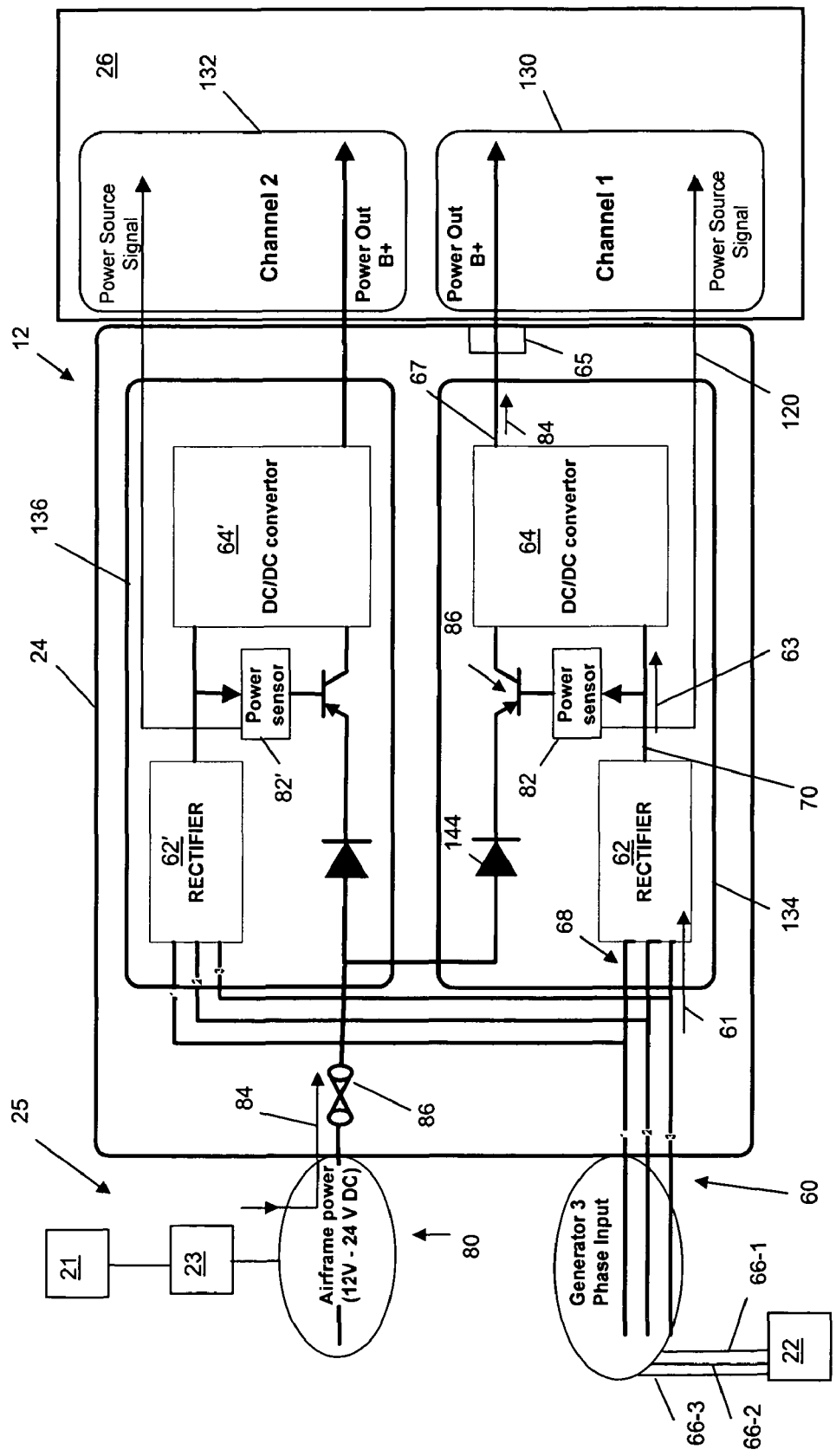
FIG. 3 illustrates a schematic representation of the aircraft engine control system of FIG. 1.

For example, as illustrated in FIG. 3, power distributor 24 includes a power distributor input 60, a rectifier 62, a DC/DC converter 64, and a power distributor output 65. The power distributor input 60 electrically couples the generator 22 to the rectifier 62 and provides the generator power output 61 to the rectifier 62. For example, the power distributor input 60 is configured as an electrical connector that couples with each of the three sets of wire coils 44 of the permanent magnetic generator 22 via a lead 66-1, 66-2, and 66-3 from each wire coil 44. In turn, the power distributor input 60 is configured to provide the three-phase alternating current (AC) generated by the generator 22 to the rectifier 62.

The rectifier 62 is configured to receive the three-phase AC generator power output 61 from the power distributor input 60, via an electrical coupling 68 with the power distributor input 60, and rectify or convert the AC generator power output 61 to a direct current (DC) generator power output 63 for use by the engine controller 26. The rectifier 62 provides the DC generator power output 63 to the DC/DC converter 64 via electrical coupling 70 for further processing.

The DC/DC converter 64 is configured to adjust a voltage associated with the DC generator power output 63 such that the voltage of the primary power output 67 provided to the engine controller 26 is within the operating range of the engine controller 26. In one arrangement, the DC/DC converter 64 is configured to provide a step down or reduction in the voltage of the DC generator power output 63 as received from the rectifier 62. For example, assume the rectifier 62 produces a DC generator power output 63 having a voltage of 24V. Further assume that the engine controller 26 operates on a power output having a nominal voltage of 12V. In this example, the DC/DC converter 64 reduces the voltage associated with the generator power output 63 from a first voltage of 24V to a second, reduced voltage power output 67 having a voltage of 12V. The DC/DC converter 64, in turn, provides the reduced voltage power output as the primary power output 67 to the engine controller 26 via the power distributor output 65.

In the above-described arrangement, the power distributor 64 is configured to process the three-phase AC power generator signal 61 received from the generator 22 and generate a primary power output 67 to operate the engine controller 26. In one arrangement, the power distributor 24 is configured to provide power to the engine controller 26 in the event of a failure of the generator 22 during operation. In such an arrangement, the power distributor 24 provides the engine controller 26 with back-up power from a secondary power source, such as the airframe power system 25, to allow continued operation of the engine controller 26 in the event that the generator 22 becomes inoperable or fails.

In this arrangement and with continued reference to FIG. 3, the power distributor 24 includes a second power distributor input 80 that electrically couples the airframe power system battery 23 to the power distributor 24. For example, the second power distributor input 80 is configured as an electrical connector that couples with the battery 23 to receive a DC battery power output 84 from the battery 23 and to provide the battery power output 84 to the power distributor 24, such as through a fuse 86.

The power distributor 24 also includes a controller or power sensor 82, such as a processor, electrically coupled to both the first power distributor input 60 and to the second power distributor input 80. The controller 82 is configured to switch from providing power from the generator 22 to the engine controller 26 to providing power from the airframe power system battery 23 to the engine controller 26 in the event that the generator 22 becomes inoperable or fails.

Figure 4:
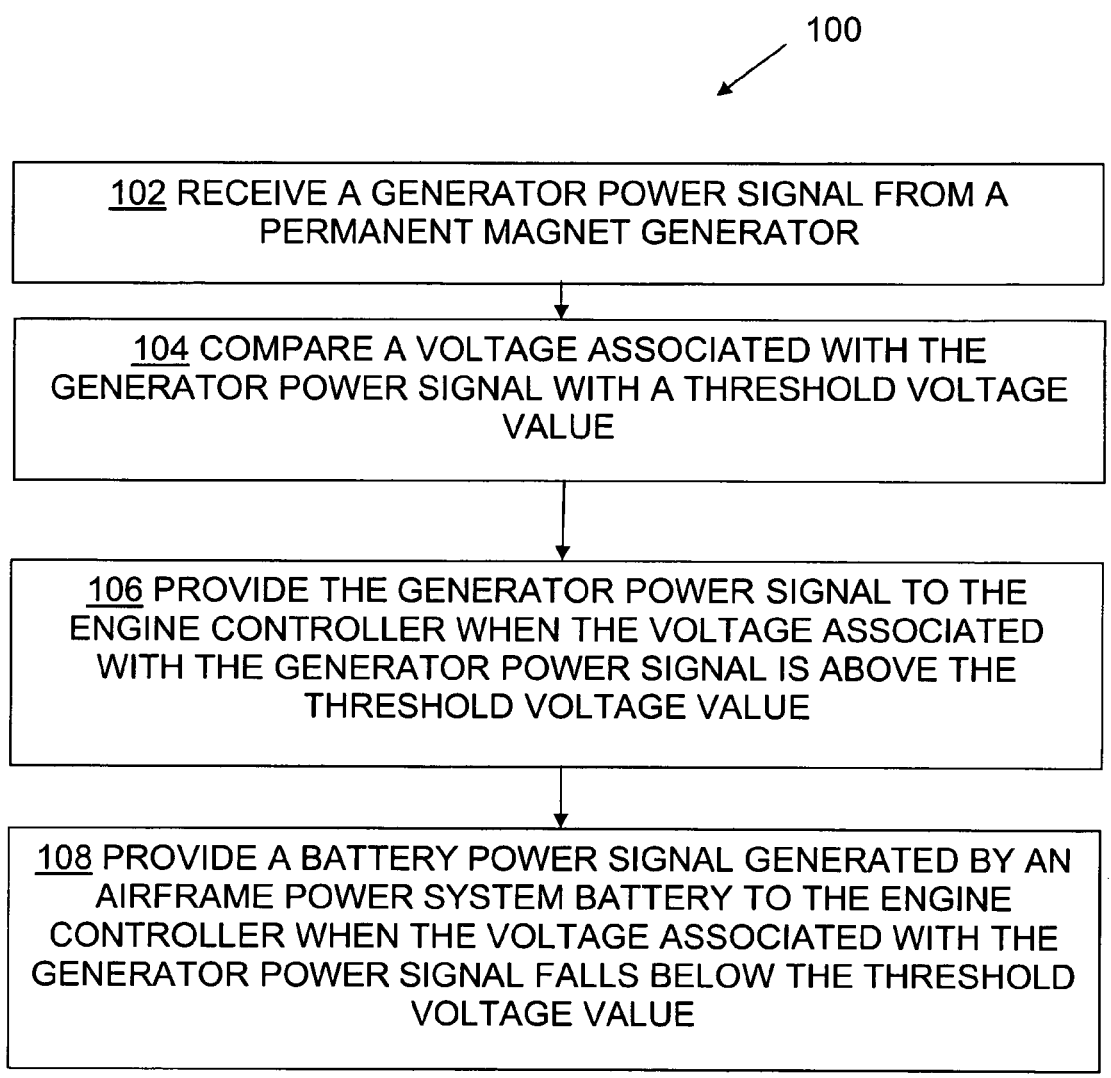
FIG. 4 is a flowchart of a procedure performed by a controller of the aircraft engine control system of FIG. 1.

FIG. 4, taken in conjunction with FIG. 3, is a flowchart 100 of a procedure performed by the controller 82 to detect operability or inoperability of the generator 22 and to provide power to the engine controller 26 accordingly.

In step 102, the controller 82 receives a generator power output from the generator 22. For example, as indicated in FIG. 3, the generator 22 provides a three-phase AC generator power output 61 to the rectifier 62 which, in turn, rectifies the signal 61 and provides a DC generator power output 63 to the controller 82.

Returning to FIG. 4, in step 104 the controller 82 compares a voltage associated with the generator power output with a threshold voltage value. Based upon the comparison, the controller 82 can detect either the operability or the inoperability of the generator 22. For example, in one arrangement, during normal operation of the generator 22, the rectifier 62 generates a DC generator power output 63 having an associated voltage greater than 12V. In the event that the generator 22 becomes compromised or fails, the rectifier 62 generates a DC power output having an associated voltage that is less than 12V. Therefore, in order to detect the operational state of the generator 22, the threshold voltage value is stored in the controller 82 with a value of 12V such that comparison of the DC generator power output 63 with the threshold voltage value indicates the operability or inoperability of the generator 22.

In step 106, the controller 82 provides the generator power output 67 to the engine controller 26 when the voltage associated with the generator power output 67 is above the threshold voltage value. For example, assume the case where, during operation of the generator 22, the rectifier 62 generates a DC generator power output 63 having an associated voltage of 24V. As a result of the comparison between the DC generator power output 63 and the threshold voltage value, the controller 82 detects that the voltage of the DC generator power output 63 is above (i.e., is greater than) the threshold voltage value and that the generator 22 is operable. In order to provide the DC power output to the engine controller 26 (i.e., through the DC/DC converter), the controller 82 maintains a field effect transistor or switch 86, electrically coupled between the second power distributor input 80 and the power distributor output 65, in an open state. By holding the switch 86 in an open state, the controller 82 minimizes or prevents the battery power output 84, as received via the second power distributor input 80, from reaching the power distributor output 65 and allows the generator 22 to provide power to the engine controller 26.

In step 108, the controller 86 provides a battery power output 84 generated by an airframe power system battery 23 to the aircraft engine controller 26 when the voltage associated with the generator power output falls below the threshold voltage value. For example, assume the case where, during operation of the generator 22, the rectifier 62 generates a DC generator power output 63 having an associated voltage of 10V. As a result of the comparison between the DC generator power output 63 and the threshold voltage value, the controller 82 detects that the voltage of the DC generator power output 63 falls below (e.g., is less than) the threshold voltage value and that the generator 22 is compromised or inoperable. As a result of the comparison, in order to provide a power output to the engine controller 26, the controller 82 maintains the switch 86, electrically coupled between the second power distributor input 80 and the power distributor output 65, in a closed state. By closing the switch 86, the controller 82 allows the airframe power system battery 23 to transmit the battery power output 84 to the power distributor output 65, such as through the DC/DC converted 64 and provide power to the engine controller 26.

As indicated above, the controller 82 is configured to detect either the operability or the inoperability of the generator 22 by comparing a voltage associated with generator power output with a threshold voltage value. Returning to FIG. 3, in one arrangement, the controller 82 is also configured to generate and transmit a power source signal 120, based upon the results of the comparison, indicating the particular power source, either the generator or the airframe power system 25, that provides power to the engine controller 26.

For example, assume the case where the controller 82 compares the DC generator power output 63 with the threshold voltage value and detects that DC generator power output 63 is above the threshold value and that the generator 22 operates to provide power to the engine controller 26. As a result of the comparison, the controller 82 transmits the power source signal 120 to an output device, such as a monitor, to indicate to a user, such as an aircraft operator, that the generator 22 operates as the power source for the engine controller 26. In another example, assume the case where the controller 82 compares the DC generator power output 63 with the threshold voltage value and detects that DC generator power output 63 is below the threshold value and that the airframe power system battery 23 operates to provide power to the engine controller 26. As a result of the comparison, the controller 82 transmits the power source signal 120 to an output device to indicate to a user that the airframe power system battery 23 operates as the power source for the engine controller 26. In this case, the power source signal 120 acts as a warning to the user that the generator 22 is inoperative and provides the user with the opportunity to land the aircraft and service the generator 22.

For convenience, the description of the power distributor 24 above has been limited to a single set of power distribution components (i.e., a single rectifier 62, DC/DC converter 64, and controller 82). However, as shown in FIG. 3, conventional engine controllers 26, such as FADECs, include two channels, a first channel 130 and a second channel 132, configured to receive a power output from a power source. Such a configuration provides operational redundancy to the engine controller 26. In one arrangement, the engine controller 26 receives power via a primary channel 130. In the event that the primary channel 130 becomes non-operational, the second channel 130, the engine controller 26 receives power via a secondary channel 132. Accordingly, as illustrated in FIG. 3, the power distributor 24 includes a first set of power distribution components 134 and a second set of power distribution components 136. The first and second sets of power distribution components 134, 136 include similar elements within the power distributor 24, as illustrated in FIG. 3. For example, each of the first and second sets of power distribution components 134, 136 include a rectifier 62, 62', a controller 82, 82' and a DC/DC converter 64, 64'. The second set of power distribution components 136 provides failover redundancy to the second channel 132 of the engine controller 26 in the event of failure of the primary channel 130 of the engine controller 26.

While various embodiments of the invention have been particularly shown and described, it will be understood by those skilled in the art that various changes in form and details may be made therein without departing from the spirit and scope of the invention as defined by the appended claims.

Figure 5:
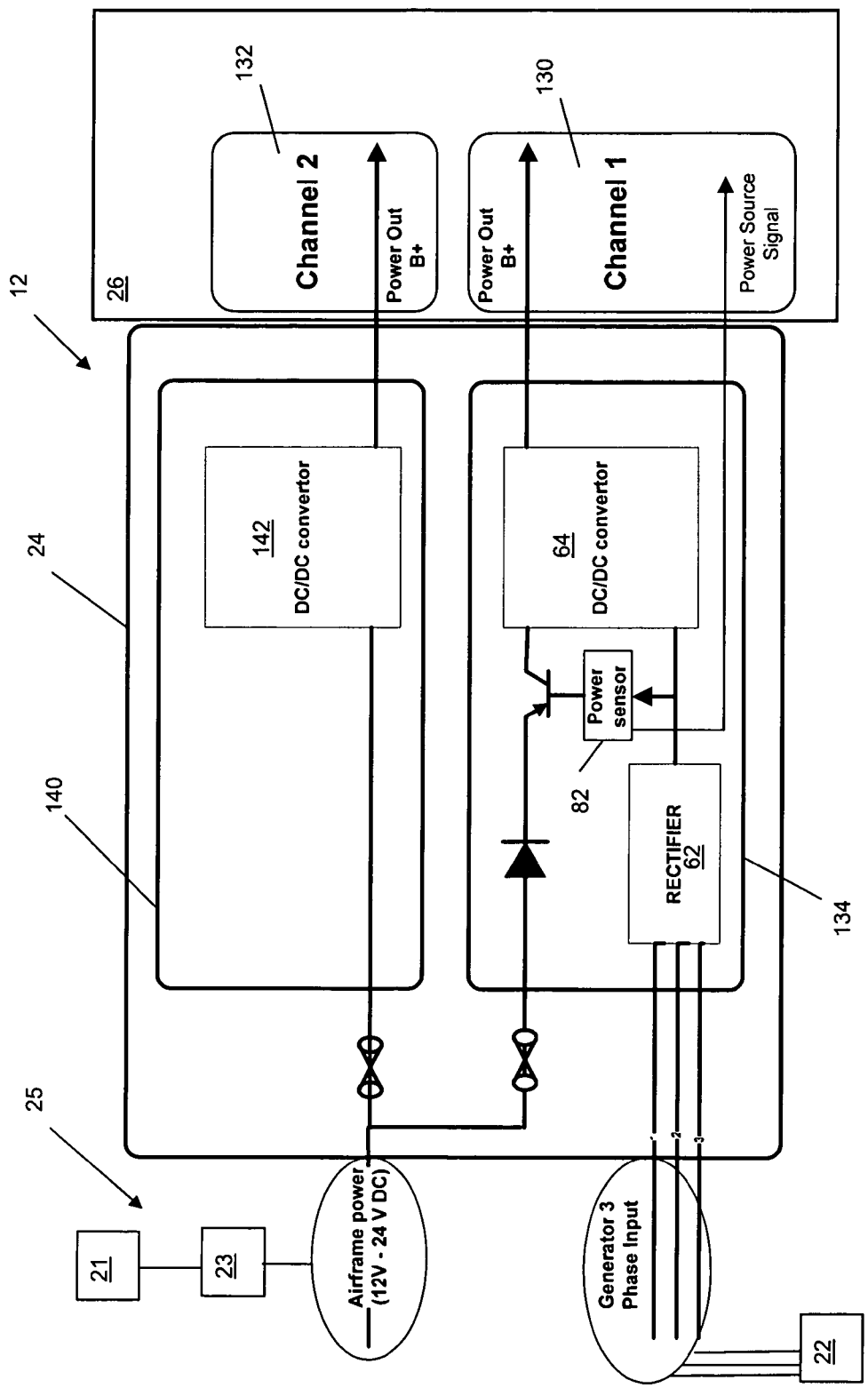
FIG. 5 illustrates a schematic representation of an alternate embodiment of the aircraft engine control system of FIG. 1.

For example, with respect to FIG. 3, the power distributor 24 includes a first set of power distribution components 134 and a second set of power distribution components 136. As illustrated, the first and second sets of power distribution components 134, 136 include similar elements and each set is electrically coupled to both the generator 22 and the airframe power system 25. Such illustration is by way of example only. In one arrangement, as shown in FIG. 5, the power distributor 24 includes first set of power distribution components 134 having a rectifier 62, controller 82, and a DC/DC converter 64 where the controller 82 is electrically coupled to the airframe power system 25 and to the generator 22. Also as shown in FIG. 5, the power distributor 24 includes a failover component 140, such as a DC/DC converter 142 electrically coupled to the airframe power system 25. The failover component 140 provides failover redundancy to the second channel 132 of the engine controller 26 in the event of failure of the primary channel 130 of the engine controller 26.

With reference to FIG. 3, in one arrangement power distributor 24 includes a power blocking diode 144 disposed in electrical communication with the first power distributor input 80 and the second power distributor input 60. The power blocking diode 44 electrically isolates the generator 22 from the battery 23 of the airframe power system. Accordingly, the power blocking diode 144 minimizes the flow of the generator power output 63 from the generator 22 to the airframe power system battery 23 to limit or prevent the generator 22 from charging the battery 23 during operation.

As indicated above, the generator 22 provides a three-phase output to the rectifier 62 of the power distributor 24. Such indication is by way of example only. In one arrangement, the rectifier 62 receives a three-phase input from a single alternator, two separate alternators, or a combination of an alternator and a generator.

As indicated above, the aircraft power distribution system 12 includes a power generator circuit, such as a generator 22. Such description is by way of example only. In one arrangement, the power generator circuit is configured as an alternator.

What is claimed is:

1. An aircraft engine power distribution system, comprising:
   a generator driven by an aircraft engine, the generator configured to produce a generator power output when driven by the aircraft engine;
   a power distributor in electrical communication with the generator, the power distributor being operable to receive the generator power output and provide the generator power output to an engine controller as a primary power output to operate the engine controller, the power distributor having:

a first power distributor input in electrical communication with the generator, a second power distributor input in electrical communication with an airframe power system battery, the airframe power system battery being operable to produce a battery power output, and a power distributor output in electrical communication with the first power distributor input and the second power distributor input, the power distributor being operable to (i) provide the generator power output, received at the first power distributor input, to the engine controller via the power distributor output as the primary power output to operate the engine controller and (ii) provide the battery power output, received at the second power distributor input, to the engine controller via the power distributor output as a back-up power output to operate the engine controller in the event of inoperability of the generator; and a controller electrically coupled to the first power distributor input and to the second power distributor input, the controller configured to:

compare a voltage associated with the generator power output with a threshold voltage value;

provide the generator power output to the engine controller via the power distributor output when the voltage associated with the generator power output is above the threshold voltage value; and provide a battery power output generated by an airframe power system battery to the engine controller via the power distributor output when the voltage associated with the generator power output falls below the threshold voltage value.

2. The aircraft engine power distribution system of claim 1, wherein the engine controller comprises a Full Authority Digital Engine Control (FADEC).

3. The aircraft engine power distribution system of claim 1, wherein the controller is operable to provide (i) a first power source signal to an output device when the voltage associated with the generator power output is above the threshold value, the first power source signal indicating that the generator provides power to the engine controller and (ii) a second power source signal to the output device when the voltage associated with voltage associated with the generator power output falls below the threshold value, the second power source signal indicating that the airframe power system battery provides power to the engine controller.

4. The aircraft engine power distribution system of claim 1, wherein the power distributor comprises a rectifier in electrical communication with the generator via the first power distributor input, the rectifier operable to rectify an alternating current generator power output and produce a direct current generator power output.

5. The aircraft engine power distribution system of claim 4, wherein the power distributor comprises a DC/DC converter disposed in electrical communication between the rectifier and the power distributor output, the DC/DC converter operable to reduce a voltage associated with the generator power output from a first voltage to a second voltage and provide the reduced voltage power output to the engine controller via the power distributor output.

6. The aircraft engine power distribution system of claim 5, wherein the DC/DC converter is disposed in electrical communication between the second power distributor input and the power distributor output, the DC/DC converter operable to receive the battery power output via the second power distributor input, reduce a voltage associated with the battery power output from a first voltage to a second voltage, and provide the reduced voltage power output to the engine controller via the power distributor output.

7. The aircraft engine power distribution system of claim 1, wherein the power distributor comprises a power blocking diode disposed in electrical communication between the first power distributor input and the second power distributor input, the power blocking diode operable to limit flow of the generator power output from the generator to the airframe power system battery.

8. An aircraft engine control system, comprising:

a generator driven by an aircraft engine, the generator configured to produce a generator power output when driven by the aircraft engine;

an engine controller operable to control at least one performance parameter of the aircraft engine;

a power distributor in electrical communication with the generator and the engine controller, the power distributor being operable to receive the generator power output and provide the generator power output to the engine controller as a primary power output to operate the engine controller, the power distributor having:

a first power distributor input in electrical communication with the generator;

a second power distributor input in electrical communication with an airframe power system battery, the airframe power system battery being operable to produce a battery power output; and a power distributor output in electrical communication with the first power distributor input and the second power distributor input, the power distributor being operable to (i) provide the generator power output, received at the first power distributor input, to the engine controller via the power distributor output as the primary power output to operate the engine controller and (ii) provide the battery power output, received at the second power distributor input, to the engine controller via the power distributor output as a back-up power output to operate the engine controller in the event of inoperability of the generator; and a controller electrically coupled to the first power distributor input and to the second power distributor input, the controller configured to:

compare a voltage associated with the generator power output with a threshold voltage value;

provide the generator power output to the engine controller via the power distributor output when the voltage associated with the generator power output is above the threshold voltage value; and provide the battery power output generated by an airframe power system battery to the engine controller via the power distributor output when the voltage associated with the generator power output falls below the threshold voltage value.

9. The aircraft engine control system of claim 8, wherein the engine controller comprises a Full Authority Digital Engine Control (FADEC).

10. The aircraft engine control system of claim 8, wherein the controller is operable to provide (i) a first power source signal to an output device when the voltage associated with the generator power output is above the threshold value, the first power source signal indicating that the generator provides power to the engine controller and (ii) a second power source signal to the output device when the voltage associated with voltage associated with the generator power output falls below the threshold value, the second power source signal indicating that the airframe power system battery provides power to the engine controller.

11. The aircraft engine control system of claim 8, wherein the power distributor comprises a rectifier in electrical communication with the generator via the first power distributor input, the rectifier being operable to rectify an alternating current generator power output and produce a direct current generator power output.

12. The aircraft engine control system of claim 11, wherein the power distributor comprises a DC/DC converter disposed in electrical communication between the rectifier and the power distributor output, the DC/DC converter operable to reduce a voltage associated with the generator power output from a first voltage to a second voltage and provide the reduced voltage power output to the engine controller via the power distributor output.

13. The aircraft engine control system of claim 12, wherein the DC/DC converter is disposed in electrical communication between the second power distributor input and the power distributor output, the DC/DC converter operable to receive the battery power output via the second power distributor input, reduce a voltage associated with the battery power output from a first voltage to a second voltage, and provide the reduced voltage power output to the engine controller via the power distributor output.

14. The aircraft engine control system of claim 8, wherein the power distributor comprises a power blocking diode disposed in electrical communication between the first power distributor input and the second power distributor input, the power blocking diode operable to limit flow of the generator power output from the generator to the airframe power system battery.

15. A method for providing power to an aircraft engine controller, comprising:
  receiving a generator power output from a generator;
  comparing a voltage associated with the generator power output with a threshold voltage value;
  providing the generator power output to the aircraft engine controller when the voltage associated with the generator power output is above the threshold voltage value;
  providing a battery power output generated by an airframe power system battery to the aircraft engine controller when the voltage associated with the generator power output falls below the threshold voltage value;
  when the voltage associated with the generator power output is above the threshold value, providing a first power source signal to an output device, the first power source signal indicating that the generator provides power to the aircraft engine controller; and
  when the voltage associated with the generator power output falls below the threshold value, providing a second power source signal to the output device, the second power source signal indicating that the airframe power system battery provides power to the aircraft engine controller.

16. An aircraft engine power distribution system, comprising:
  a power generator circuit driven by an aircraft engine, the power generator circuit configured to produce a generated power output when driven by the aircraft engine, the power generator circuit being independent from an airframe power system;
  a power distributor having:
    a first power distributor input in electrical communication with the power generator circuit,
    a second power distributor input in electrical communication with an airframe power system battery, the airframe power system battery being operable to produce a battery power output, and
    a power distributor output in electrical communication with the first power distributor input and the second power distributor input,
    the power distributor being operable to (i) provide the generated power output, received at the first power distributor input, to the engine controller via the power distributor output as a primary power output to operate the engine controller and (ii) provide the battery power output, received at the second power distributor input, to the engine controller via the power distributor output as a back-up power output to operate the engine controller in the event of inoperability of the generator; and
  a controller electrically coupled to the first power distributor input and to the second power distributor input, the controller configured to:
  compare a voltage associated with the generator power output with a threshold voltage value;
  provide the generator power output to the engine controller via the power distributor output when the voltage associated with the generator power output is above the threshold voltage value; and
  provide a battery power output generated by an airframe power system battery to the engine controller via the power distributor output when the voltage associated with the generator power output falls below the threshold voltage value.

* * * * *